United States Patent
Daiku et al.

(10) Patent No.: US 6,903,294 B1
(45) Date of Patent: Jun. 7, 2005

(54) APPARATUS FOR SEPARATING PLASTIC CHIPS

(75) Inventors: Hiroyuki Daiku, Osaka (JP); Masanori Tsukahara, Osaka (JP); Tetsuya Inoue, Osaka (JP); Hidehiko Maehata, Osaka (JP)

(73) Assignee: HItachi Zosen Corporation (JP)

( * ) Notice: Subject to any disclaimer, the term of this patent is extended or adjusted under 35 U.S.C. 154(b) by 127 days.

(21) Appl. No.: 10/362,351
(22) PCT Filed: Sep. 4, 2000
(86) PCT No.: PCT/JP00/06002
§ 371 (c)(1),
(2), (4) Date: Feb. 21, 2003
(87) PCT Pub. No.: WO02/20164
PCT Pub. Date: Mar. 14, 2002
(51) Int. Cl.[7] ................................................. B03C 7/00
(52) U.S. Cl. ..................................... 209/127.3; 209/129
(58) Field of Search ........................... 209/127.1, 127.3, 209/128–130

(56) References Cited

U.S. PATENT DOCUMENTS 2,559,076 A * 7/1951 Johnson .................... 209/127.4
5,746,320 A * 5/1998 Fujita et al. ............... 209/127.4
6,271,492 B1 * 8/2001 Maehata et al. ........... 209/127.1
6,467,628 B1 * 10/2002 Maehata et al. ............ 209/12.2

FOREIGN PATENT DOCUMENTS

| JP | 57032748 | | 2/1982 | |
| JP | 08071453 | | 3/1996 | |
| JP | 08071453 A | * | 3/1996 | ............ B03C/7/08 |
| JP | 2000308837 | | 11/2000 | |

* cited by examiner

Primary Examiner—Donald P. Walsh
Assistant Examiner—Joseph Rodriguez
(74) Attorney, Agent, or Firm—Kusner & Jaffe

(57) ABSTRACT

A first and second electrostatic sorting sections are arranged below a tribo-electrifying device in this order in a vertical direction to form a sorting electrostatic field between a drum electrode and an opposing electrode. Plastic pieces separated from the other plastic pieces by the sorting electrostatic field in the first electrostatic separating section are introduced into a sorting electrostatic field in the second electrostatic separating section for second separation, thereby increasing the separation purity and recovery rate of plastic pieces.

7 Claims, 10 Drawing Sheets

APPARATUS FOR SEPARATING PLASTIC CHIPS

TECHNICAL FIELD

The present invention relates to a plastic sorting apparatus for sorting crushed plastic pieces composed of plural types of plastics, according to their types.

BACKGROUND ART

A conventional plastic sorting apparatus comprises two electrode plates arranged parallel with each other in a vertical direction so as to form a space of a predetermined size therebetween, the electrode plates having a high-voltage power supply connected thereto to form a separating electrostatic field therebetween, wherein plastic pieces are loaded into the separating electrostatic field from above, and the electrostatic force of the separating electrostatic field is used to vary the falling trajectories of the plastic pieces correspondingly to the charges of the plastic pieces, thereby separating the plastic pieces from one another according to their type.

However, to improve the separation precision of the conventional apparatuses, it is necessary to use long electrode plates to increase the time required for the plastic pieces to pass through the separating electrostatic field, which disadvantageously requires the size of the apparatuses to be increased. Further, the plastic pieces may adhere to the electrodes, resulting in degraded separation performance, to hinder continuous processing.

Thus, the inventors have proposed the plastic sorting apparatus shown in FIG. 9 as a technique for sorting out crushed plastic pieces. This plastic sorting apparatus is composed of a hopper 100 into which plastic pieces a and b including two or more types mixed together are loaded, a tribo-electrifying device 101 arranged below the hopper 100 to stir the plastic pieces a and b of different types to contact them with each other, thereby electrifying the plastic pieces a and b to the respective polarities and electrification amounts according to their type, and an electrostatic separating device 105 that separates the plastic pieces a and b from each other by applying a high voltage from a high-voltage power supply 104 to a drum electrode 102 and an opposing electrode 103 both arranged below the tribo-electrifying device 101, to form a sorting electrostatic field Ea.

In this plastic sorting apparatus, the tribo-electrifying device 101 frictionally contacts the plastic pieces a and b of different types with each other to tribo-electrify them to the respective polarities and electrification amounts corresponding to an electrification array. Then, when the plastic pieces a and b are fed onto the drum electrode 102, image force is applied to the plastic pieces a and b, which are then attracted to a surface of the drum electrode 102 and carried to the sorting electrostatic field Ea. Then, in the sorting electrostatic field Ea, electrostatic force and centrifugal force are applied to the plastic pieces a and b, so that the forces acting on the plastic pieces b having the same polarity (−) as that of the drum electrode 102 are such that image force< (electrostatic force+centrifugal force). As a result, the plastic pieces b fall so as to follow falling trajectories extending from a surface of the metal drum electrode 102 to the opposing electrode 103 and are thus collected in a separation container 106. On the contrary, the forces acting on the plastic pieces a having a polarity opposite to that (−) of the drum electrode 102 are such that (image force+electrostatic force)>centrifugal force, so that the plastic pieces a remain attracted to the drum electrode 102 or fall so as to follow falling trajectories approaching the drum electrode 102 and are then collected in a separation container 107.

Methacryl resin [acrylic resin] (hereinafter referred to as "PMMA"), polyethylene resin (hereinafter referred to as "PE"), polypropylene resin (hereinafter referred to as "PP"), and vinyl chloride resin (hereinafter referred to as "PVC") occupy about 80% of all the plastics consumed as material for plastic products. Further, polyethylene terephthalate resin (hereinafter referred to as "PET") used for PET bottles is separately sorted out and recovered. To use these resins as recycle material for material recycling, they must be precisely (99% or more) sorted out according to their type.

Further, it is contemplated that in order to achieve a high purity and a high recovery rate with the electrostatic separating device 105 of the above described plastic sorting apparatus, a separator 108 arranged at the boundary between the separation containers 106 and 107 may pivot in directions A and B to adjust a separation position so as to improve the purity.

FIG. 10 shows the relationship between the recovery rate and purity obtained by the inventors through sorting experiments in which the angle of the separator 108 was adjusted. In this figure, the purity and the recovery rate are determined using the following equation:

Recovery rate (%)=weight (g) of plastic pieces of a target type collected in a predetermined separation container/total weight of plastic pieces of the target type loaded into an electrostatic separating device.

Purity (%)=weight (g) of plastic pieces of a predetermined type collected in a predetermined separation container/weight of all plastic pieces collected in the separation container.

FIG. 10 indicates that it is likely that an increase in purity reduces the recovery rate, whereas an increase in recovery rate reduces the purity. Thus, if plastic pieces are to be recovered according to their material, the rate at which plastic pieces are recovered becomes insufficient to make the separating operation less efficient even if the plastic pieces have an attainable purity of 99% or higher.

Further, with a lower voltage applied to the drum electrode 102 and opposing electrode 103, the field intensity of the sorting-electrostatic field Ea decreases to reduce changes of the falling trajectories of plastic pieces a and b, thereby reducing the precision (purity and recovery rate) with which the plastic pieces a and b are separated from each other. Thus, to increase the separation precision for the plastic pieces a and b, a high-voltage electrode 6 with a much higher voltage must be used to form a sorting electrostatic field Ea of an increased field intensity. In this case, however, a very high voltage must be applied to the metal drum electrode 102 and opposing electrode 103, and all members of the electrostatic separating device 105 must thus have high-voltage-resistant and highly-insulated structures, thereby substantially increasing facility costs. Consequently, it is difficult to apply a voltage exceeding a predetermined value.

Furthermore, when plastic pieces PMMA, PE, PP, and PVC are trobo-electrified using the tribo-electrifying device 101, they are electrified to their respective polarities and electrification amounts in accordance with the electrification array of (+ side) PMMA-PE-PP-PVC (− side). For example, if PE and PP, which are closely ordered in the electrification array, are contacted with each other for tribo-electrification, the PE is electrified to (+), while the PP is electrified to (−), with a small difference in electrification amount therebetween. Accordingly, if different types of plastic pieces are mixed together which are closely ordered in the electrification array and have only a small difference in electrification amount therebetween, then a problem with the above described conventional plastic sorting apparatus is that the plastic pieces cannot be sorted out with a high purity of 99% or higher and a high recovery rate.

It is an object of the present invention to provide a plastic sorting apparatus that can sort out plastic pieces according to their type with a high purity and a high recovery rate.

SUMMARY OF THE INVENTION

The present invention provides a plastic sorting apparatus comprising a tribo-electrifying section that causes plural types of plastic pieces to frictionally contact with one another for electrification, and an upper-stage electrostatic separating section, a lower-stage electrostatic separating section and a recovery section which are all located-below the tribo-electrifying section downwardly in this order, characterized in that the upper and lower-stage electrostatic separating sections each comprises a metallic rotationally-movable electrode having a top portion to which plastic pieces-are fed, an opposing, electrode located to oppose a downwardly-moving portion of the rotationally movable electrode, and a high-voltage power supply for applying a high voltage to the rotationally movable electrode and opposing electrode to form a separating electrostatic field therebetween, in that a connection section is provided for feeding the rotationally movable electrode of the lower-stage electrostatic separating section with plastic pieces separated toward the rotationally movable electrode in the upper-stage electrostatic separating section, and in that polarities applied by the high-voltage power supply respectively to the rotationally movable electrode and opposing electrode in the upper-stage electrostatic separating section are opposite to polarities applied by the high-voltage power supply to the rotationally movable electrode and opposing electrode in the lower-stage electrostatic separating section.

According to this construction, the upper- and lower-stage electrostatic separating sections, arranged in the vertical direction to electrostatically separate and sort out electrified plastic pieces according to their polarity and electrification amount, are located below the tribo-electrifying device which stirs and tribo-electrifies the plastic pieces, so that plastic pieces attracted to the rotationally movable electrode in the upper-stage electrostatic separating section or following falling trajectories approaching the rotationally movable electrode, are fed to the second electrostatic separating section via the connection section. Most of these plastic pieces are of a target type and have charges of a polarity opposite to that of the rotationally movable electrode of the first electrostatic separating section. In the second electrostatic separating section, the plastic pieces of the target type are caused to repel the rotationally movable electrode and recovered, while a small amount of plastic pieces of different types are caused to be attracted to the rotationally movable electrode or to follow the falling trajectories approaching the rotationally movable electrode for separation. Consequently, the plastic pieces of the target type can be sorted out at a high purity and a high recovery rate.

DESCRIPTION OF PREFERRED EMBODIMENTS

The present invention will be described in further detail with reference to the attached drawings.

Figure 1:
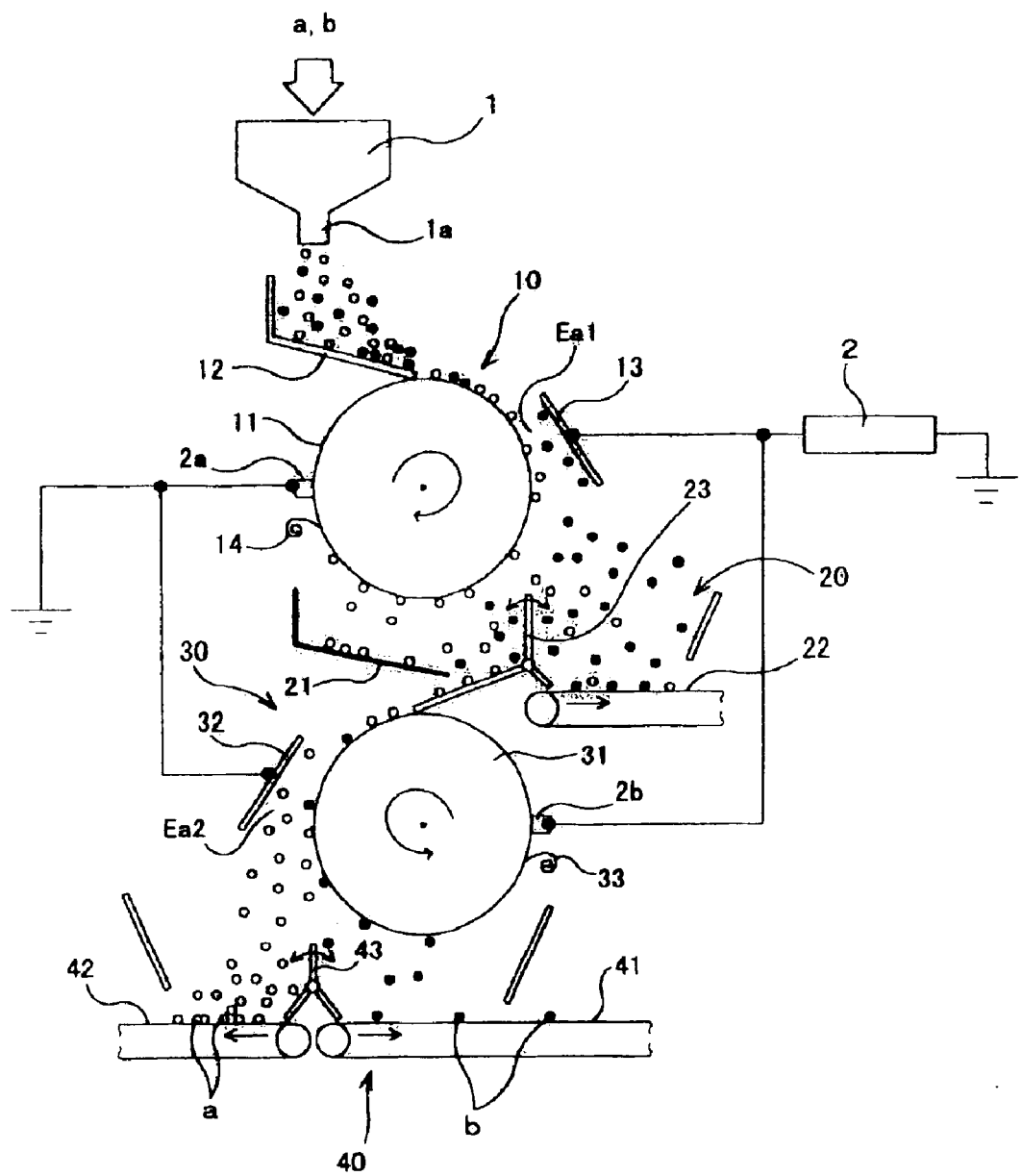
FIG. 1 is a schematic diagram of an entire plastic sorting apparatus according to a first embodiment of the present invention.

First, a first embodiment of a plastic sorting apparatus according to the present invention will be described with reference to FIGS. 1 and 2.

This plastic sorting apparatus comprises a tribo-electrifying device 1 that stirs at least two different types (materials) of plastic pieces (for example, plastic crushed waste to be sorted out) a and b mixed together to frictionally contact the different types of plastic pieces a and b with each other in order to tribo-electrify the plastic pieces to respective polarities and electrification amounts in accordance with their order in an electrification array, an upper-stage electrostatic separating section 10 arranged below an exit 1a of the tribo-electrifying device 1 to electrostatically separate the plural types of plastic pieces a and b from each other, and a lower-stage electrostatic separating section 30 arranged below the upper-stage electrostatic separating section 10 to further electrostatically separate one of the plural types of plastic pieces a and b separated by the upper-stage electrostatic separating section 10. An upper-stage connection section (connection section) 20 is provided between the upper-stage electrostatic separating section 10 and the lower-stage electrostatic separating section 30 to guide the separated plastic pieces. Further, a recovery section 40 is provided below the lower-stage electrostatic separating section 30.

The upper-stage electrostatic separating section 10 comprises a metallic cylindrical upper-stage drum electrode 11 (rotationally movable electrode) arranged below the tribo-electrifying device 1 and rotationally driven at a predetermined velocity (peripheral velocity) in the direction of an arrow in the figure (clockwise) around a horizontal shaft, a supply chute 12 of, for example, a vibrating type which feeds an upper end of the upper-stage drum electrode 11 with a fixed amount of the plastic pieces a and b supplied by the tribo-electrifying device 1, an upper-stage opposing electrode 13 arranged obliquely above a portion of the upper-stage drum electrode 11 which rotationally moves downward, so as to form a space of a predetermined size between the drum electrode and the opposing electrode, and an upper-stage scraper 14 slidably contacting with the portion of the upper-stage drum electrode 11 which rotationally moves downward, to scrape off the plastic pieces a and b therefrom. Then, for example, a positive electrode (+) of the high-voltage power supply 2 is connected to the upper-stage opposing electrode 13, while a negative electrode (−) thereof is connected to the upper-stage drum electrode 11 via an earth by a feeding brush 2a. Consequently, an upper-stage separating electrostatic field Ea1 is formed between the upper-stage drum electrode 11 and the upper-stage opposing electrode 13.

Further, the upper-stage connection section 20 has an upper-stage loading chute 21 and an upper-stage recovery conveyor 22 arranged therein, the upper-stage loading chute 21 collecting plastic pieces a (including a small number of plastic pieces b) electrified to a (+) polarity and separated from the other plastic pieces toward the upper-stage drum electrode 11, the upper-stage recovery conveyor 22 collecting plastic pieces b (including a small number of plastic pieces a) electrified to a (−) polarity and separated from the other plastic pieces toward the upper-stage opposing electrode 13. An upper-stage separator (separator) 23 is arranged between the upper-stage loading chute 21 and the upper-stage recovery conveyor 22, and comprises a separation plate arranged immediately below a peripheral side end of the upper-stage drum electrode 11 and the lower end of which is caused to pivot around an axis parallel with the axis of the upper-stage drum electrode 11 so as to adjust the separation conditions for plastic pieces a separated toward the upper-stage loading chute 21 and plastic pieces b separated toward the upper-stage recovery conveyor 22. The separation plate of the upper-stage separator 23 is caused to pivot by a manual rotationally-movable mechanism or actuator (not shown) so as to separate the plastic pieces a and b from each other with a desired purity.

The lower-stage electrostatic separating section 30 comprises a metallic cylindrical lower-stage drum electrode 31 (rotationally movable electrode) arranged below an exit of the first guide chute 21 and rotationally driven at a predetermined velocity (peripheral velocity) in the direction of an arrow in the figure (counterclockwise) around a horizontal shaft parallel with the upper-stage drum electrode 11, a lower-stage opposing electrode 32 arranged obliquely above a portion of the lower-stage drum electrode 31 which rotationally moves downward, so as to form a space of a predetermined size between the drum electrode and the opposing electrode, and a lower-stage scraper 33 slidably contacting with the portion of the lower-stage drum electrode 31 which rotationally moves downward, to scrape off the attracted plastic pieces therefrom. The positive electrode (+) of the high-voltage power supply 2 is connected to the lower-stage drum electrode 32 via a feeding brush 2b, while the negative electrode (−) thereof is connected to the lower-stage opposing electrode 32 via an earth. Consequently, a lower-stage sorting electrostatic field Ea2 is formed between the lower-stage drum electrode 31 and the lower-stage opposing electrode 32.

Furthermore, the recovery section 40 has a lower-stage recovery conveyor 41 and a separation and take-out conveyor 42 both arranged below the lower-stage separating electrostatic field Ea2, the lower-stage recovery conveyor 41 collecting the plastic pieces b electrified to the (−) polarity and attracted to the second drum electrode 11 or following falling trajectories approaching the upper-stage drum electrode 11, and a separation and take-out conveyor 42 that collects, with a high purity, a large number of plastic pieces a electrified to the (+) polarity and falling from the lower-stage drum electrode 31 toward the lower-stage opposing electrode 32 owing to electrostatic force and centrifugal force. Further, a second separator 43 is arranged between the lower-stage recovery conveyor 41 and the separation and take-out conveyor 42 to adjust the separation conditions for plastic pieces b separated toward the lower-stage recovery conveyor 41, located closer to the lower-stage drum electrode 31, and plastic pieces a and b separated toward the separation take-out conveyor 42, located closer to the lower-stage opposing electrode 32. The second separator 43 has a separation plate arranged immediately below a peripheral side end of the lower-stage drum electrode 31 and the lower end of which is supported so as to be pivotable around an axis parallel with the axis of the lower-stage drum electrode 31. The separation plate is caused to pivot in the direction of an arrow in the figure by a manual rotationally-movable mechanism or actuator (not shown) so as to separate the plastic pieces a and b from each other with a desired purity.

The upper-stage drum electrode 11 and the lower-stage drum electrode 31 are set to, for example, have the same width, outside diameter, and rotation speed so as to have an equal attraction area per unit time and thus equal processing capability in the upper-stage electrostatic separating section 10 and the lower-stage electrostatic separating section 30.

With the above described construction, if the plastic pieces a and b are PE and PVC, respectively, and are contacted with each other by the tribo-electrifying device 1, then the plastic pieces a are tribo-electrified to the (+) polarity with a predetermined electrification amount while the PVC plastic pieces b are tribo-electrified to the (−) polarity with a predetermined electrification amount. Then, when these plastic pieces a and b are dropped from the supply chute 12 and fed onto the upper-stage drum electrode 11 of the upper-stage electrostatic separating section-10, to which the (−) polarity has been applied, then the plastic pieces a and b are attracted, by image force, to a surface of the upper-stage drum electrode 11 and moved to the upper-stage sorting electrostatic field Ea1. In the upper-stage sorting electrostatic field Ea1, the plastic pieces a and b are subjected to electrostatic force and centrifugal force, and the plastic pieces a (PE), which are electrified to (+), remain attracted to the upper-stage drum electrode 11 or are separated and dropped onto the upper-stage loading chute 21 by following tracks approaching the upper-stage drum electrode 11. Furthermore, the plastic pieces b (PVC) electrified to (−) are repelled by the upper-stage drum electrode 11, fall following tracks approaching the upper-stage opposing electrode 13 and are then separated and collected by the intermediate recovery conveyor 22. The plastic pieces b (including a small number of plastic pieces a), which are collected by the intermediate recovery conveyor 22, are returned to the tribo-electrifying device 1 by a circulating device (not shown).

Then, the plastic pieces a and b (including a small amount of plastic pieces b) collected in the upper-stage loading chute 21 are further fed onto the lower-stage drum electrode 31 of the lower-stage electrostatic separating section 30, to which the (+) polarity has been applied. Then, the plastic pieces a and b are attracted, by image force, to a surface of the lower-stage drum electrode 31 and moved to the lower-stage separating electrostatic field Ea2. In the lower-stage Separating electrostatic field Ea2, a small number of plastic pieces b electrified to (−) remain attracted to the lower-stage drum electrode 31, having the (+) polarity, or-most of them fall following tracks approaching the lower-stage drum electrode 31 and are collected on the lower-stage recovery conveyor 41. On the other hand, a large amount of plastic pieces a electrified to (+) are subjected to electrostatic force and centrifugal force and are repelled by the lower-stage drum electrode 31. The large amount of plastic pieces a fall following tracks approaching the lower-stage opposing electrode 32 and are collected on the separation and take-out conveyor 42 with a high purity and a high recovery rate. In this embodiment, the two types of plastic pieces are sorted out, but a plurality of types may be used. Further, if the plastic pieces b separated and collected on the lower-stage recovery conveyor 41 solely have a high purity, they may be used as sorted plastic pieces as they are. On the contrary, if they have a low purity or plural types of plastic pieces are mixed together, the lower-stage circulating device (not shown) returns the plastic pieces to the tribo-electrifying device 1.

Figure 2:
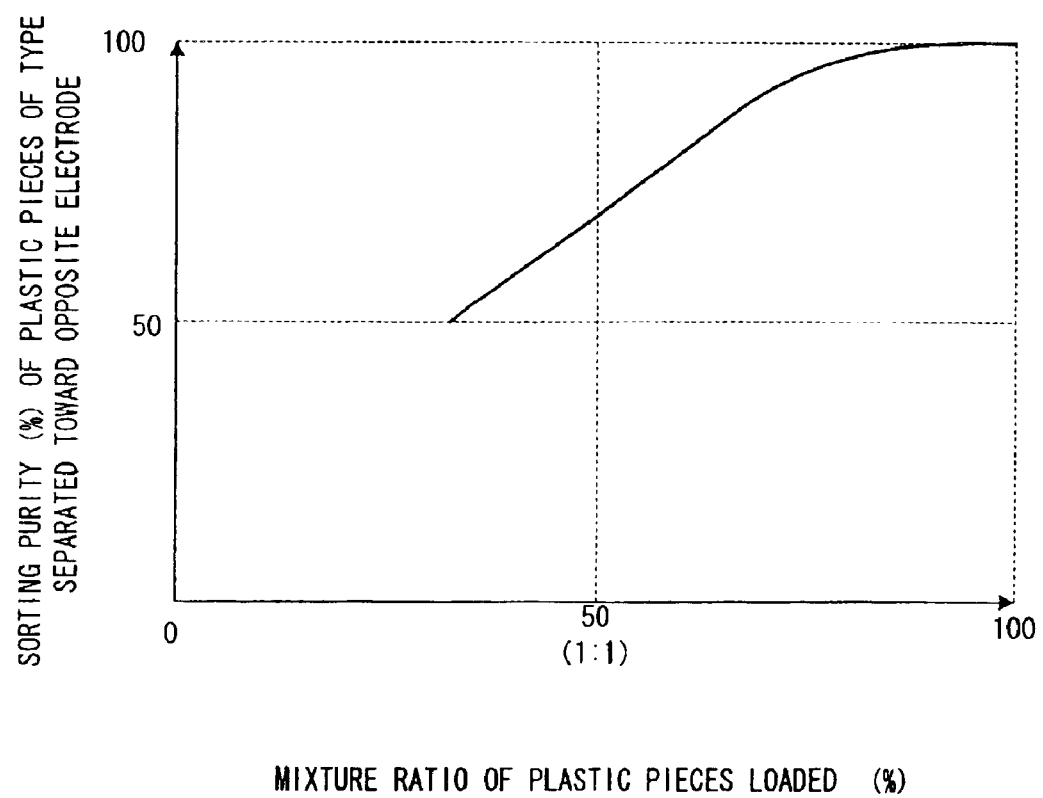
FIG. 2 is a graph showing a mixture ratio of plastic pieces of different types vs. a purity of plastic pieces separated toward an opposing electrode.
Figure 9:
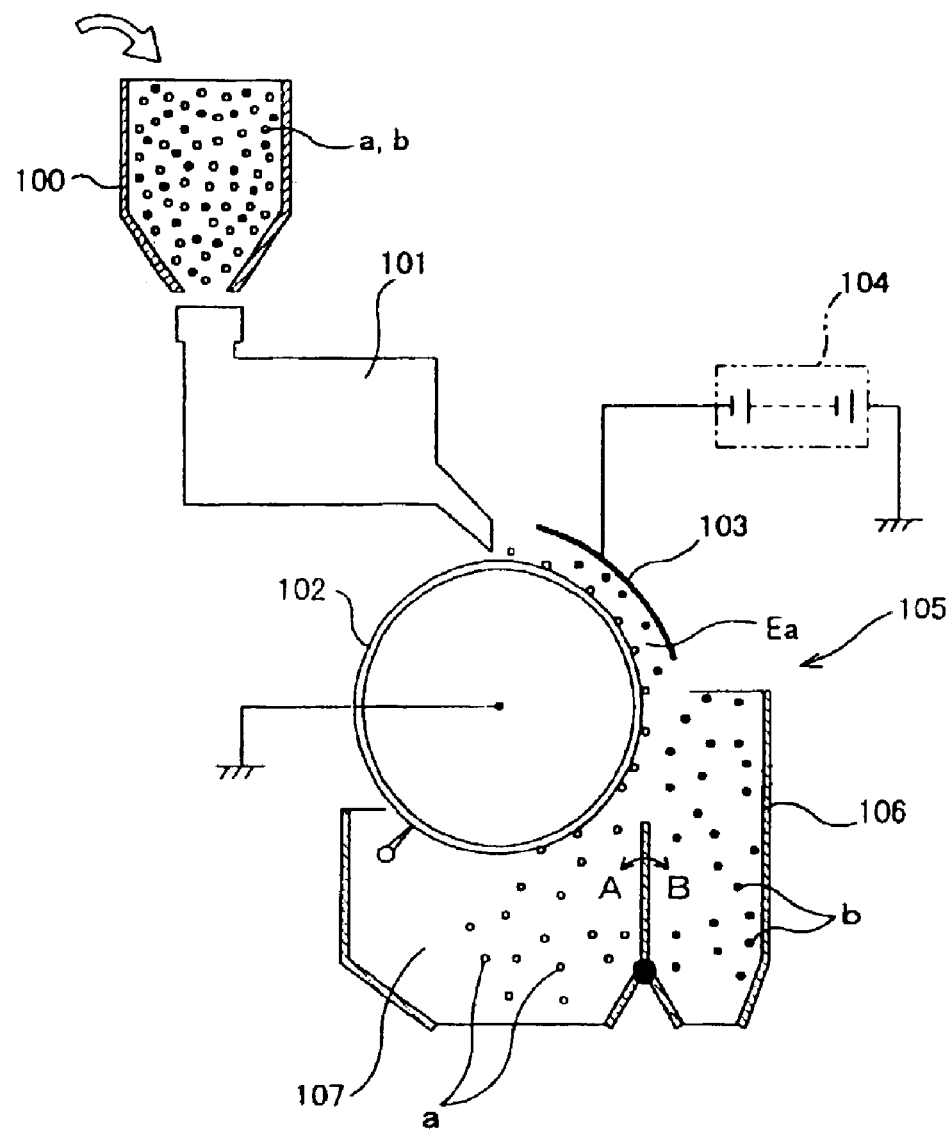
FIG. 9 is a schematic diagram of an entire conventional plastic sorting apparatus.
Figure 10:
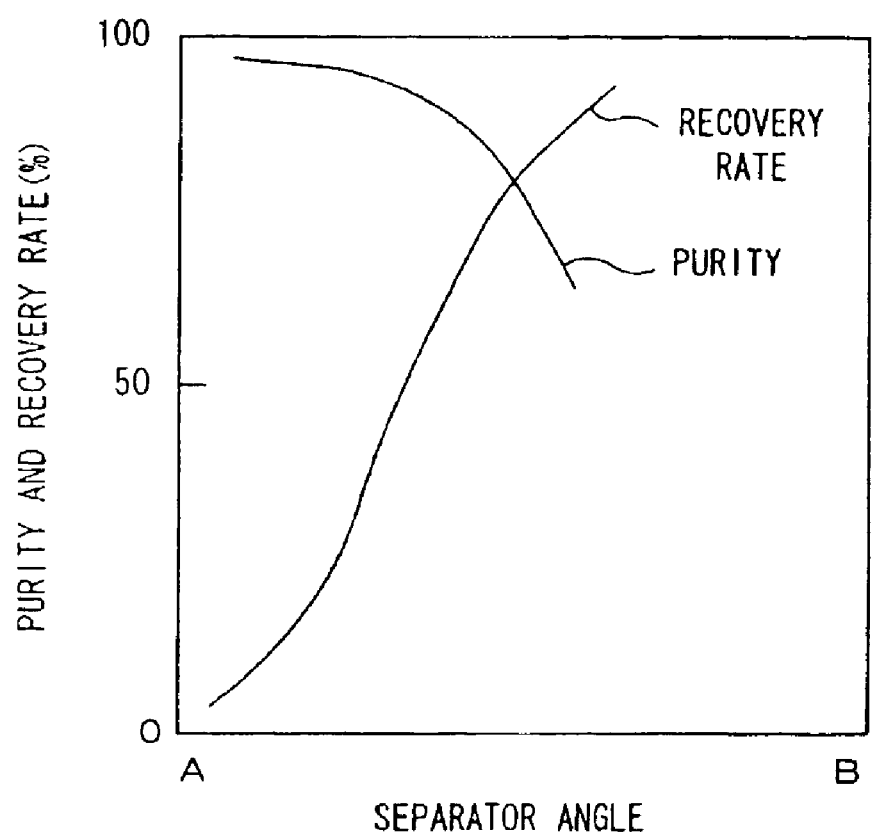
FIG. 10 is a graph showing a relation between an angle of a separator of the conventional plastic sorting apparatus and purity/recovery rate of plastic pieces.

The inventors have experimentally confirmed that with the plastic sorting apparatus shown in FIG. 9 and comprising an endless belt-like electrode, described later, as well as a drum electrode and an opposing electrode, the relationship between the mixture ratio of different types of loaded plastic pieces and the purity of plastic pieces separated toward the opposing electrode is as shown in the graph of FIG. 2. This figure indicates that the purity of plastic pieces of the type sorted out, separated and carried toward the opposing electrode increases linearly with the mixture ratio of these plastic pieces to the total amount of plastic pieces loaded into the plastic sorting apparatus.

That is, with the above described plastic sorting apparatus, all plastic pieces are loaded onto the drum electrode, and the plastic pieces of the type electrified to the polarity opposite to that of the drum electrode are attracted to the surface thereof because of image force. Then, these plastic pieces are rotationally moved downward to enter the separating electrostatic field, where these plastic pieces on the drum electrode are subjected to centrifugal force and electrostatic force. At this time, with few plastic pieces of the polarity opposite to that of the drum electrode, it is very unlikely that the plastic pieces are superposed on one another or interfere with each other, and image force and electrostatic force work effectively. Consequently, most of the plastic pieces of the opposite polarity can be reliably separated toward the drum electrode, thereby enabling the recovery of these plastic pieces with a high purity and a high recovery rate.

Accordingly, if target plastics are to be separated from the other plastic pieces with a high purity and a high recovery rate, this object can be attained by setting the electrification polarity of the separated plastic pieces to be the same as that of the high voltage applied to the drum electrode and further setting the amount of a different type of plastic pieces provided to be smaller than that of the target type of plastic-pieces to set a lower mixture ratio for the former type.

According to the above described embodiment, most of the plastic pieces a and b fed to the lower-stage electrostatic separating section 30 from the intermediate loading chute 21 of the upper-stage connection section 20 are the plastic pieces a, which are electrified to the (+) polarity, because the amount of the plastic pieces b, electrified to the (−) polarity and separated by the upper-stage electrostatic separating section 10, is substantially reduced. Then, a high voltage of the (+) polarity is applied to the lower stage drum electrode 31 of the lower-stage electrostatic separating section 30 to reliably remove the small amount of plastic pieces b, thereby allowing the plastic pieces a to be collected on the separation and take-out conveyor 42 with a high purity and a high recovery rate.

According to the inventors' experiments, when plastic pieces PE, which are electrified to (+), and plastic pieces PVC, which are electrified to (−), were supplied to the tribo-electrifying device 1 after being mixed together so that the mixture ratio of 50% of the former to the latter was 1:1, the plastic pieces PE could be collected on the separation and take-out conveyor 42 of the recovery section 40 with a high purity exceeding 99% and a high recovery rate of 90% or more. In the experiments, the amount of plastic pieces processed was 300 Kg/H, the drum electrodes 11 and 31 had a peripheral velocity of about 50 m/sec, and a voltage of 30 KV was applied by the high-voltage power supply 2.

Figure 3:
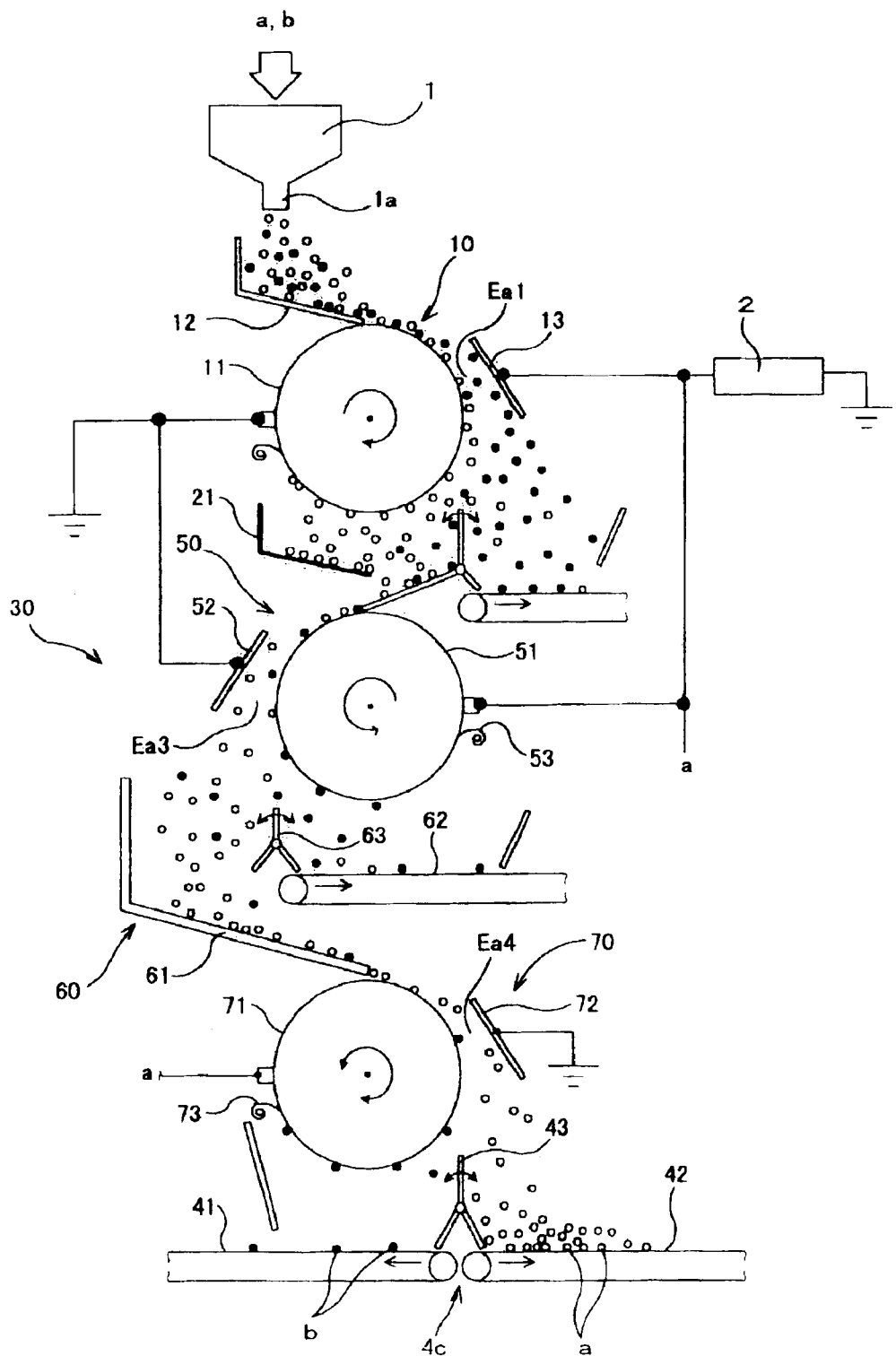
FIG. 3 is a schematic diagram of an entire plastic sorting apparatus according to a second embodiment of the present invention.

Next, a second embodiment of a plastic sorting apparatus will be described with reference to FIG. 3. The same members as those in the first embodiment are denoted by the same reference numerals, and their description is thus omitted.

In the second embodiment, the lower-stage electrostatic separating section 30 according to the first embodiment is provided with a lower-stage upper-level electrostatic sorting section 50 and a lower-stage lower-level electrostatic sorting section 70 which are arranged in the vertical direction, and connected together by a lower-stage connection section 60.

That is, the lower-stage upper-level electrostatic sorting section 50 comprises a lower-stage upper-level drum electrode 51 (rotationally movable electrode) arranged below an exit of the upper-stage loading chute 21 and rotationally driven in the direction of an arrow in the figure (counterclockwise), a lower-stage upper-level opposing electrode 52 arranged so as to form a space of a predetermined size between the lower-stage upper-level drum electrode 31 and the opposing electrode 52, and a lower-stage upper-level scraper 53 slidably contacting with the lower-stage upper-level drum electrode 51 to scrape off the plastic pieces therefrom. The positive electrode (+) of the high-voltage power supply 2 is connected to the lower-stage upper-level drum electrode 51, while the negative electrode (−) thereof is connected to the lower-stage upper-level opposing electrode 0.52 via an earth. Consequently, a lower-stage upper-level separating electrostatic field Ea3 is formed between the lower-stage upper-level drum electrode 51 and the lower-stage upper-level opposing electrode 52.

Furthermore, the lower-stage connection section 60 has a lower-stage loading chute 61 and a lower-stage recovery conveyor 62 both arranged below the lower-stage upper-level separating electrostatic field Ea3, the lower-stage loading chute 61 collecting plastic pieces a (including a small number of plastic pieces b) electrified to the (+) polarity and separated toward the lower-stage upper-level opposing electrode 52, the lower-stage recovery conveyor 62 collecting plastic pieces b (including a small number of plastic pieces a) electrified to the (−) polarity and separated toward the lower-stage upper-level drum electrode 51. Further, a lower-stage separator (separator) is arranged below the lower-stage upper-level separating electrostatic field Ea3 and between the lower-stage loading chute 61 and the lower-stage recovery conveyor 62, and comprises a separation plate to adjust the separation conditions for plastic pieces a separated toward the lower-stage upper-level loading chute 61 and plastic pieces b separated toward the lower-stage recovery conveyor 62.

The lower-stage lower-level electrostatic sorting section 70 comprises a lower-stage lower-level drum electrode 71 (rotationally-movable electrode) arranged below an exit of the lower-stage loading guide chute 61 and rotationally driven in the direction of an arrow in the figure (clockwise), a lower-stage lower-level opposing electrode 72 arranged so as to form a space of a predetermined size between the lower-level drum electrode 71 and the opposing electrode 72, and a lower-stage lower-level scraper 73 slidably contacting with the lower-stage lower-level drum electrode 71 to scrape off the plastic pieces therefrom. The positive electrode (+) of the high-voltage power supply 2 is connected to the lower-stage lower-level drum electrode 71, while the negative electrode (−) thereof is connected to the lower-stage lower-level opposing electrode 72 via an earth. Consequently, a lower-stage lower-level separating electrostatic field Ea4 is formed between the lower-stage lower-level drum electrode 71 and the lower-stage lower-level opposing electrode 72.

According to the above described second embodiment, plastic pieces a and b separated toward the lower-stage upper-level opposing electrode 52 in the lower-stage upper-level electrostatic sorting section 50 are fed to the lower-stage lower-level electrostatic separating section 70 via the lower-stage loading chute 61 of the lower-stage connection section 60. At this time, most of the plastic pieces a and b are plastic pieces a separated by the lower-stage upper-level electrostatic separating section 50 of the upper-stage electrostatic separating section 10 and most of which have been electrified to (+). These plastic pieces a are mixed with plastic pieces b slightly electrified to (−). When the plastic pieces a and b are fed to the lower-level lower-stage electrostatic sorting section 70, a large amount of plastic pieces a are separated and collected on the separation and take-out conveyor 42 with a high purity and a high recovery rate, the conveyor 42 being located closer to the lower-stage lower-level opposing electrode 72. In addition, a small number of plastic pieces b are reliably separated and collected on the lower-stage recovery conveyor 41, located closer to the lower-stage lower-level drum electrode 71.

Consequently, the different types of plastic pieces can be separated from each other with a higher purity and a higher recovery rate than in the first embodiment. Furthermore, even if the different types of plastic pieces have only a small difference in electrification amount therebetween, these types can be separated from each other with a high purity and a high recovery rate.

Figure 4:
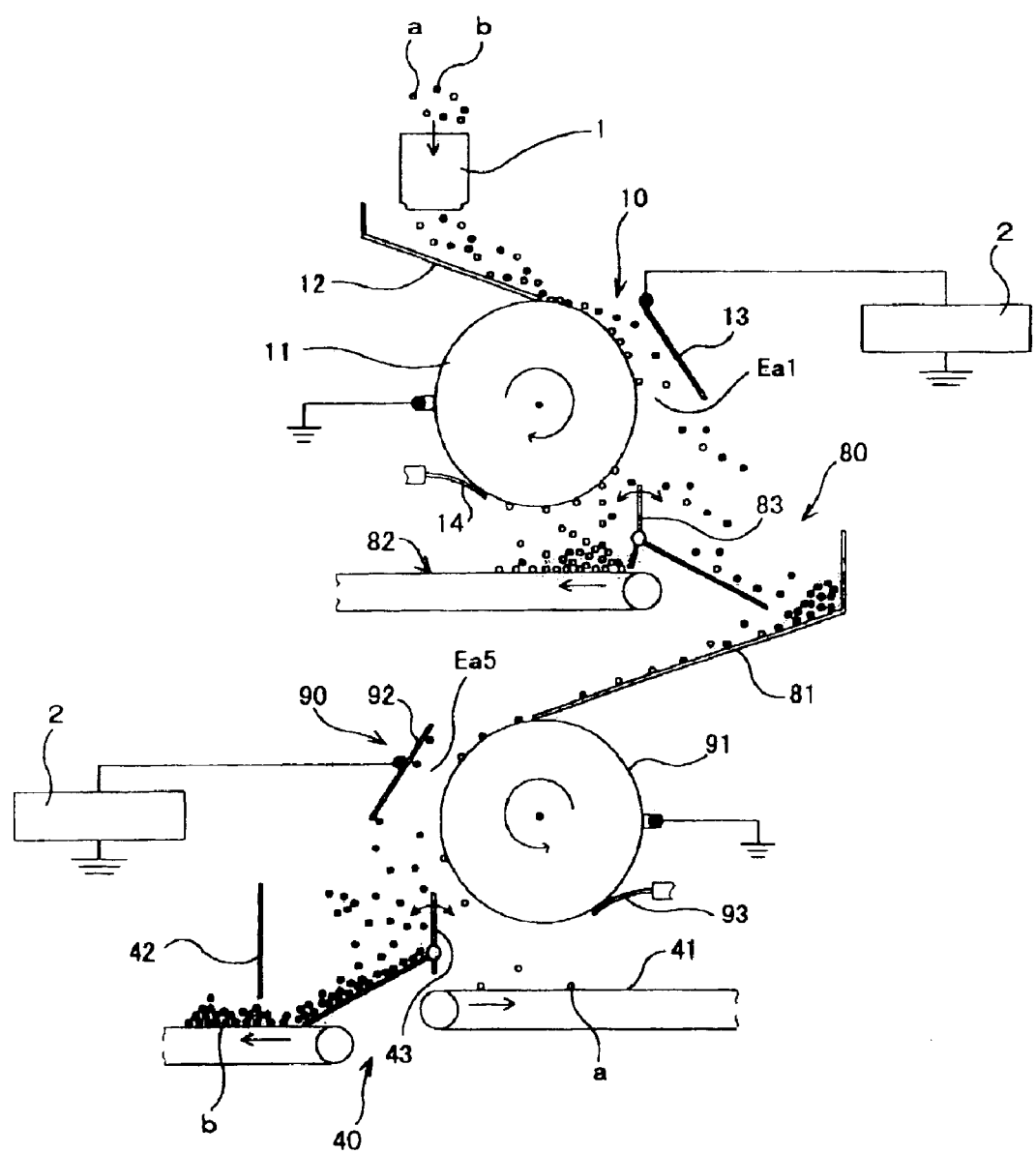
FIG. 4 is a schematic diagram of an entire plastic sorting apparatus according to a third embodiment of the present invention.

Moreover, a third embodiment of a plastic sorting apparatus will be described with reference to FIG. 4. The same members as those in the above embodiments are denoted by the same reference numerals, and their description is thus omitted.

In the first embodiment, plastic pieces a (including a small amount of plastic pieces b) separated toward the upper-stage drum electrode 11 in the upper-stage electrostatic separating section 10 are fed to the lower-stage electrostatic separating section 30 via the upper-stage connection section 20. In this third embodiment, however, plastic pieces b (including a small amount of plastic pieces a) separated toward the upper-stage opposing electrode 13 in the upper-stage electrostatic separating section 10 are fed to the lower-stage electrostatic separating section 90 via the upper-stage connection section 80.

The upper stage connection section 80 comprises an upper-stage loading chute 81 that receives and feeds plastic pieces a and b separated toward the upper-stage opposing electrode 13, to the lower-stage electrostatic separating section 90, an upper-stage recovery conveyor 82 that receives plastic pieces a and b separated toward the upper-stage drum electrode 11, and an upper-stage separator 83 that can use a separation plate to adjust the separation conditions for the plastic pieces. The plastic pieces a and b collected on the upper-stage recovery conveyor 82 are returned to the tribo-electrifying device 1 by the circulating device (not shown) as required.

Further, the lower-stage electrostatic separating section 90 comprises a lower-stage drum electrode 91, a lower-stage opposing electrode 92, and a lower-stage scraper 93 as in the case with the first embodiment, but differs therefrom in that the positive electrode (+) of the high-voltage power supply 2 is connected to the lower-stage opposing electrode 92, while the negative electrode (−) thereof is connected to the lower-stage drum electrode 91 via an earth. A lower-stage separating electrostatic field Ea5 is formed between the lower-stage drum electrode 91 and the lower-stage opposing electrode 92.

According to the above described third embodiment, plastic pieces b (including a small amount of plastic pieces a) separated toward the upper-stage opposing electrode 13 in the upper-stage electrostatic separating section 10 are fed to the lower-stage drum electrode 91 of the lower-stage electrostatic separating section 90 via the upper-stage loading chute 81 of the upper-stage connection section 80. A large amount of plastic pieces b, which have been electrified to (−), are separated toward the lower-stage opposing electrode 92 and received by the separation and take-out conveyor 42, whereas a small amount of plastic pieces at which have been electrified to (+), are separated toward the lower-stage drum electrode 91 and received by the lower-stage recovery conveyor 41. Accordingly, a large amount of plastic pieces b can be separated from the plastic pieces a with a high purity and a high recovery rate. Further, the graph of FIG. 2 indicates that if of the plastic pieces a and b loaded from the tribo-electrifying device 1, the target plastic pieces b have a higher mixture ratio than the plastic pieces a, then the plastic pieces b can be separated and collected on the separation and take-out conveyor 42 with a higher purity and a higher recovery rate.

Figure 5:
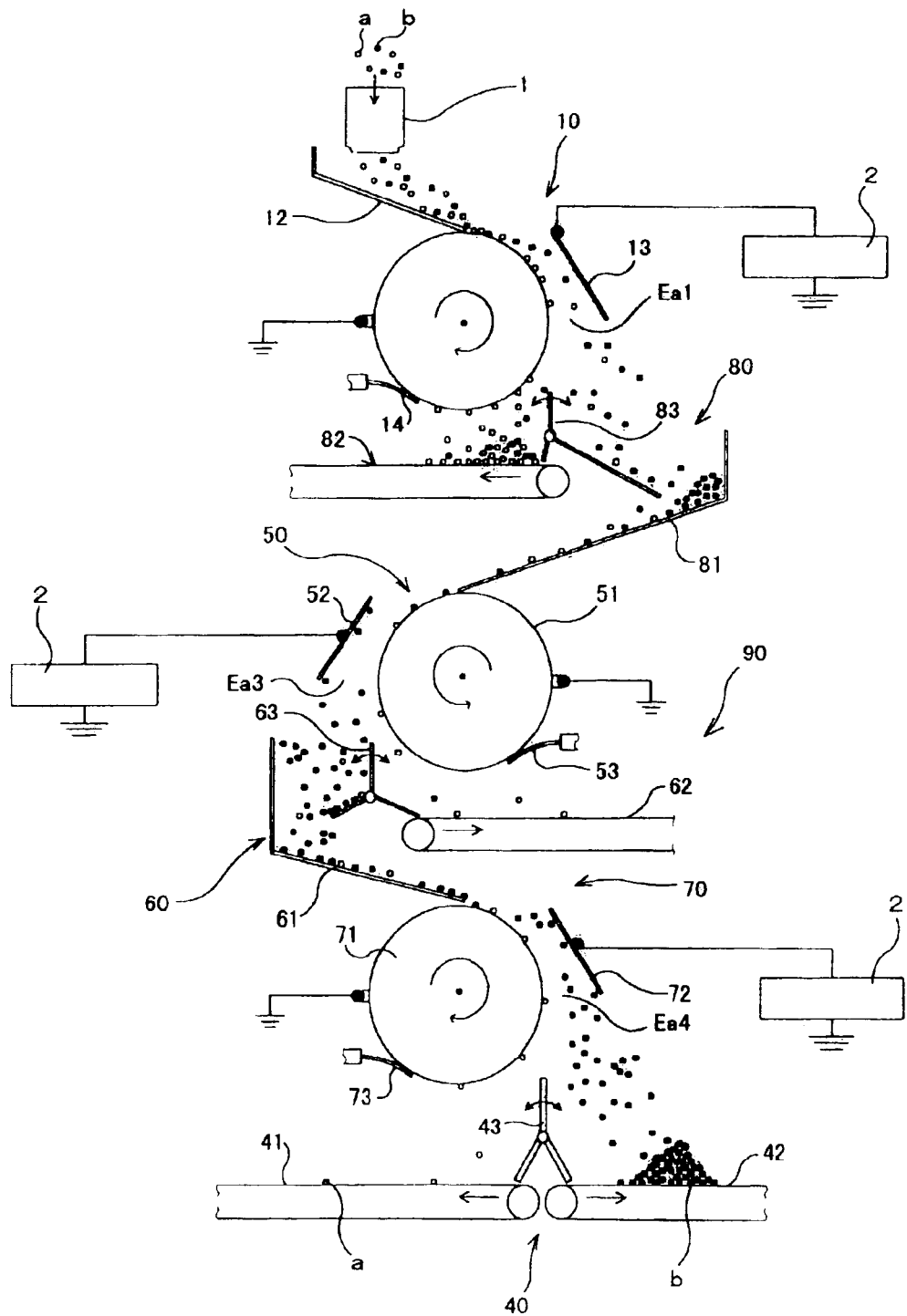
FIG. 5 is a schematic diagram of an entire plastic sorting apparatus according to a fourth embodiment of the present invention.

Furthermore, a fourth embodiment of a plastic sorting apparatus will be described with reference to FIG. 5. The same members as those in the above embodiments are denoted by the same reference numerals, and their description is thus omitted.

In this fourth embodiment, the lower-stage electrostatic sorting section 90 of the third embodiment is constructed similarly to the second embodiment, and high voltages of the same polarities as those in the upper-stage electrostatic sorting section 10 are applied to the lower-stage upper-level electrostatic sorting section 60 and lower-stage lower-level electrostatic sorting section 70 by the high-voltage power supply 2.

According to the fourth embodiment, as in the second embodiment, plastic pieces b separated toward the upper-stage opposing electrode 13 in the upper-stage electrostatic separating section 10 can further be separated and collected on the separation and take-out conveyor 42 with a high purity and a high recovery rate. Even if the different types of plastic pieces have only a small difference in electrification amount therebetween, these types can be separated from each other with a high purity and a high recovery rate. Further, the graph of FIG. 2 indicates that if of the plastic pieces loaded from the tribo-electrifying device 71, the target plastic pieces b have a higher mixture ratio than the plastic pieces a, then the plastic pieces b can be separated from the plastic pieces a with a higher purity and a higher recovery rate.

Figure 6:
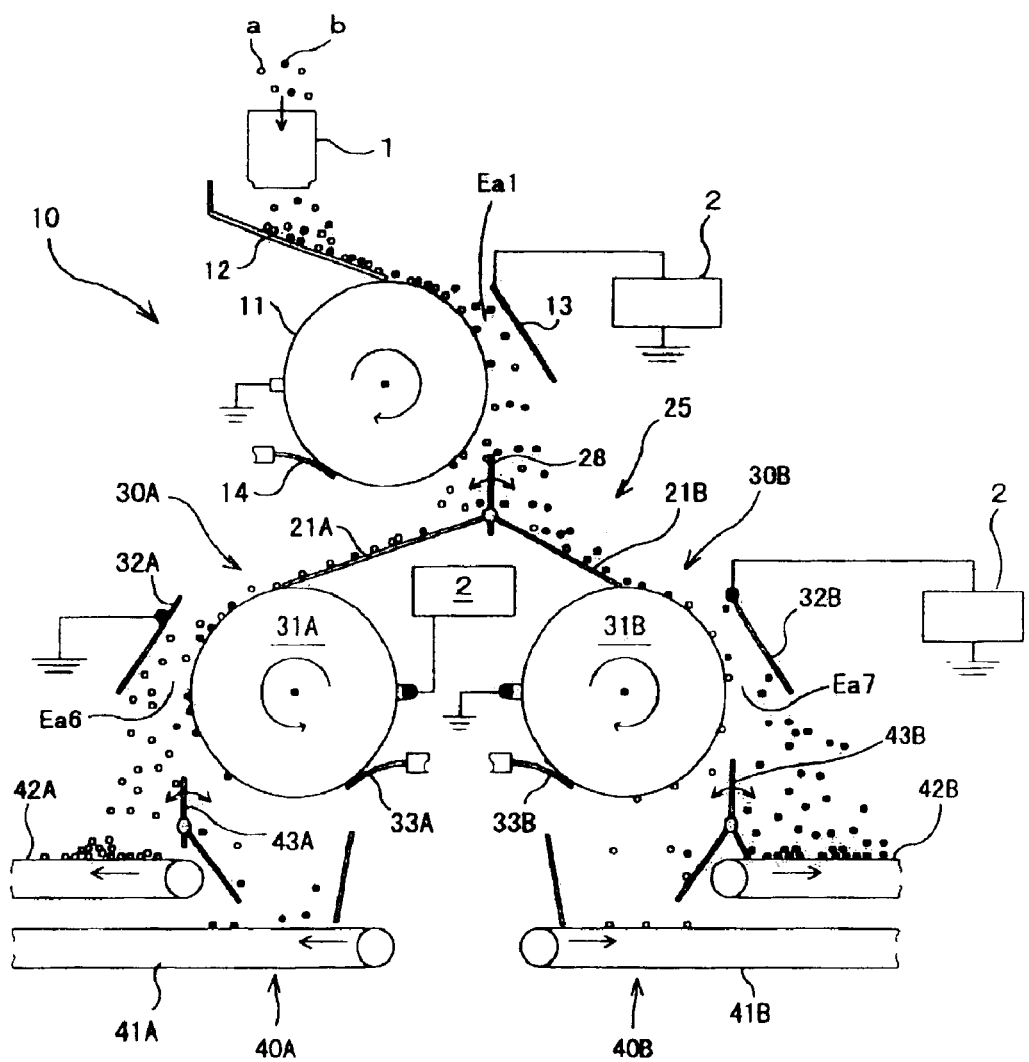
FIG. 6 is a schematic diagram of an entire plastic sorting apparatus according to a fifth embodiment of the present invention.

Furthermore, FIG. 6 shows a fifth embodiment of a plastic sorting apparatus.

This plastic sorting apparatus is obtained by merging the first and third embodiments together, and comprises the single upper-stage electrostatic separating section 10 used for the purposes of both embodiments, and a lower-stage first and second electrostatic sorting sections 30A and 30B and a first and second recovery sections 40A and 40B all of which are arranged below the upper-stage electrostatic sorting section 10 via an upper-stage connection section 25.

That is, the upper-stage connection section 25 is provided with an upper-stage first loading chute 26 that receives and feeds plastic pieces a (including a small amount of plastic pieces b) separated toward the upper-stage drum electrode 11, to the lower-stage first electrostatic sorting section 30A, an upper-stage second loading chute 27 that receives and feeds plastic pieces b (including a small amount of plastic pieces a) separated toward the upper-stage opposing electrode 13, to the lower-stage second electrostatic sorting section 30B, and an upper-stage separator 28.

Further, the lower-stage first electrostatic sorting section 30A comprises a lower-stage first drum electrode (rotationally movable electrode) 31A arranged below an exit of an upper-stage first loading chute 21A and rotationally driven in the direction of an arrow in the figure (counterclockwise), a lower-stage first opposing electrode 32A arranged so as to form a space of a predetermined size between the lower-stage first drum electrode 31A and the opposing electrode 32A, and a lower-stage first scraper 33A that scrapes off the plastic pieces b from the lower-stage first drum electrode 31A. The positive electrode (+) of the high-voltage power supply 2 is connected to the lower-stage first drum electrode 31A, while the negative electrode (−) thereof is connected to the lower-stage first opposing electrode 32A via an earth. Consequently, a lower-stage first separating electrostatic field Ea6 is formed between the lower-stage first drum electrode 31A and the lower-stage first opposing electrode 32A.

The first recovery section (recovery section) 40A has a lower-stage first recovery conveyor 41A and a lower-stage first separation and take-out conveyor 42A, the lower-stage first recovery conveyor 41A receiving plastic pieces b separated toward the lower-stage first drum electrode 31A, the lower-stage first separation and take-out conveyor 42A receiving plastic pieces a separated toward the lower-stage first opposing electrode 32A. The plastic pieces b on the lower-stage first recovery conveyor 41A are returned to the tribo-electrifying device 1 by the circulating device (not shown) as required.

Further, the lower-stage second electrostatic sorting section 30B comprises a lower-stage second drum electrode (rotationally movable electrode) 31B arranged below an exit of the second loading chute 21B and rotationally driven in the direction of an arrow in the figure (counterclockwise), a lower-stage second opposing electrode 32B arranged so as to form a space of a predetermined size between the lower-stage second drum electrode 31B and the opposing electrode 32B, and a lower-stage second scraper 33B slidably contacting with the lower-stage second drum electrode 31B to scrape off the attracted plastic pieces a therefrom. The positive electrode (+) of the high-voltage power supply 2 is connected to the lower-stage second opposing electrode 32B, while the negative electrode (−) thereof is connected to the lower-stage second drum electrode 31B via an earth. Consequently, a lower-stage second separating electrostatic field Ea7 is formed between the lower-stage second drum electrode 31B and the lower-stage second opposing electrode 32B.

The second recovery section (recovery section) 40B has a lower-stage second recovery conveyor 41B and a lower-stage second separation and take-out conveyor 42B, the lower stage second recovery conveyor 41B receiving plastic pieces a separated toward the lower-stage second drum electrode 31B, the lower-stage second separation and take-out conveyor 42B receiving plastic pieces b separated toward the lower-stage second opposing electrode 32B. The plastic pieces a on the lower-stage second recovery conveyor 41B are returned to the tribo-electrifying device 1 by the circulating device (not shown) as required.

According to the above described embodiment, the plastic pieces a and b separated by the upper-stage electrostatic separating section 10 are fed to the lower-stage first electrostatic sorting section 30A and to the lower-stage second electrostatic sorting section 30B for separation. Of the plastic pieces a and b supplied by the upper-stage first loading chute 21A, a small amount of plastic pieces b are separated toward the lower-stage first drum electrode 31A in the lower-stage first electrostatic sorting section 30A, while a large amount of plastic pieces a are separated toward the lower-stage first opposing electrode 32B. Consequently, the plastic pieces a to be collected on the lower-stage first separation and take-out conveyor 42A can be separated from the other plastic pieces with a high purity and a high recovery rate. Further, of the plastic pieces a and b supplied by the upper-stage second loading chute 21B, a small amount of plastic pieces a are separated toward the lower-stage second drum electrode 31B in the lower-stage second electrostatic sorting section 30B, while a large amount of plastic pieces b are separated toward the lower-stage second opposing electrode 32B. Consequently, the plastic pieces b to be collected on the lower-stage second separation and take-out conveyor 42B can be separated from the other plastic pieces with a high purity and a high recovery rate. Therefore, if two or plural types of plastic pieces are to be separated from each other, plastic pieces a having the largest electrification amount on the (+) side and plastic pieces b having the largest electrification amount on the (−) side can be simultaneously separated from the other plastic pieces with a high purity and a high recovery-rate.

Figure 7:
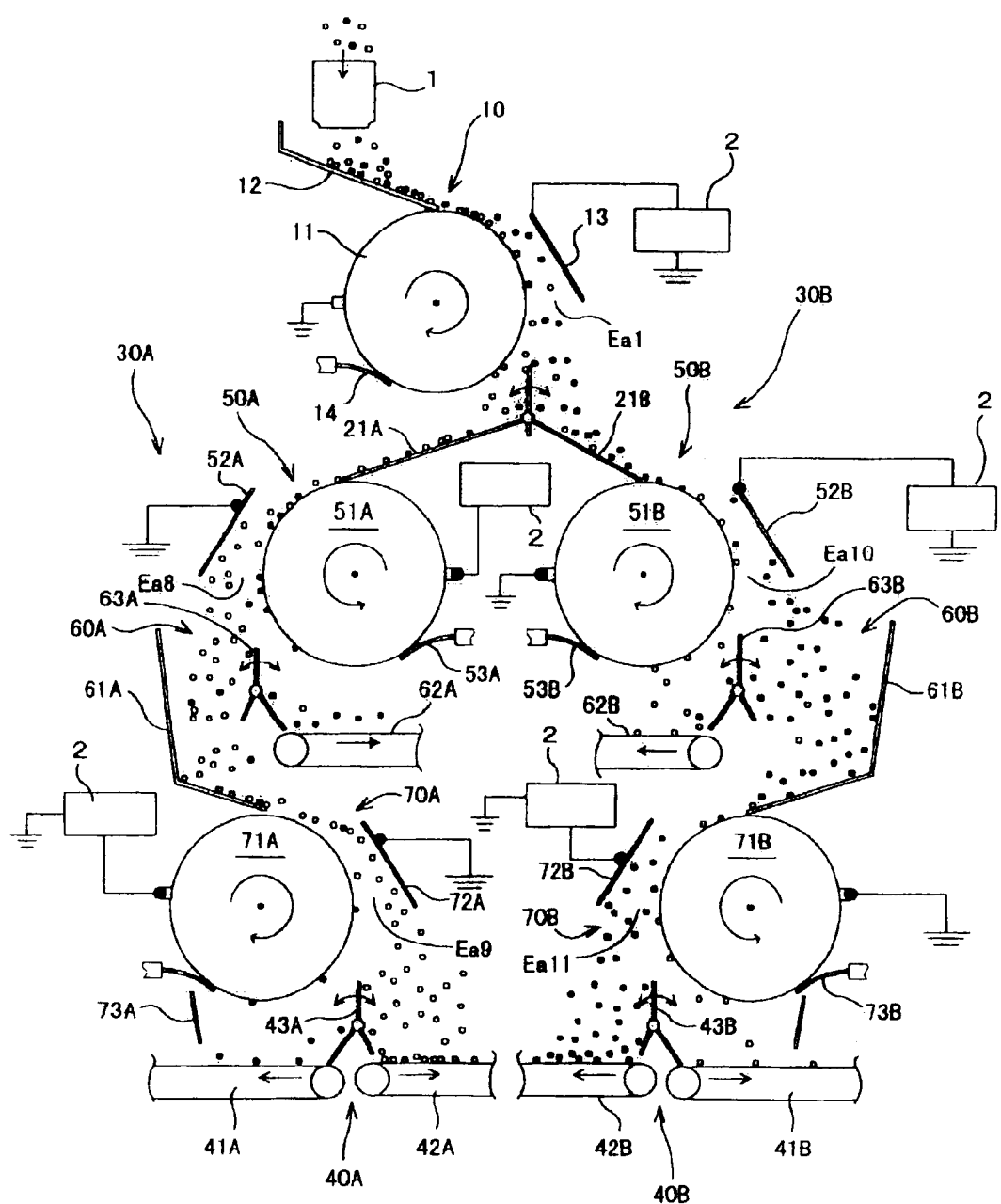
FIG. 7 is a schematic diagram of an entire plastic sorting apparatus according to a sixth embodiment of the present invention.

Further, FIG. 7 shows a sixth embodiment of a plastic sorting apparatus.

This plastic sorting apparatus is obtained by merging the second and fourth embodiments together, wherein the lower-stage first electrostatic separating section 30A is composed of a lower-stage first upper-level electrostatic sorting section 50A, a lower-stage first connection section 60A, and a lower-stage first lower-level electrostatic sorting section 70A, and the lower-stage second electrostatic sorting section 30B is composed of a lower-stage second upper-level electrostatic sorting section 50B, a lower-stage second connection section 60B, and a lower-stage second lower-level electrostatic sorting section 70B.

That is, the lower-stage first upper-level electrostatic sorting section 50A comprises a lower-stage first upper-level drum electrode 51A (rotationally movable electrode) arranged below an exit of the upper-stage first loading chute 21A, a lower-stage first upper-level opposing electrode 52A, and a lower-stage first upper-level scraper 53A. The positive electrode (+) of the high-voltage power supply 2 is connected to the lower-stage first upper-level drum electrode 51A, while the negative electrode (−) thereof is connected to the lower-stage first upper-level opposing electrode 52A via an earth. Consequently, a lower-stage first upper-level sorting electrostatic field Ea8 is formed between the lower-stage first upper-level drum electrode 51A and the lower-stage first upper-level opposing electrode 52A.

Further, the lower-stage first connection section 60A has a lower-stage first loading chute 61A and a lower stage first recovery conveyor 62A both arranged below the lower-stage first upper-level sorting electrostatic field Ea8, the lower-stage first loading chute 61A collecting plastic pieces a (including a small number of plastic pieces b) separated toward the lower-stage upper-level drum electrode 11, the lower-stage first recovery conveyor 62A collecting plastic pieces b (including a small number of plastic pieces a) separated toward the upper-stage opposing electrode 13. Further, a lower-stage first separator (separator) 63A is provided which causes a separation plate to pivot so as to adjust the separation conditions for plastic pieces b separated toward the lower-stage first upper-level drum electrode 51A and plastic pieces a separated toward the lower-stage first upper-level opposing electrode 52A.

Further, the lower-stage first lower-level electrostatic sorting section 70A comprises a lower-stage first lower-level drum electrode (rotationally movable electrode) 71A arranged below an exit of the lower-stage first loading guide chute 61A, a lower-stage first lower-level opposing electrode 72A, and a lower-stage first lower-level scraper 73A. The positive electrode (+) of the high-voltage power supply 2 is connected to the lower-stage first lower-level drum electrode 71A, while the negative electrode (−) thereof is connected to the lower-stage first lower-level opposing electrode 72A via an earth. Consequently, a lower-stage first lower-level sorting electrostatic field Ea9 is formed between the lower-stage first lower-level drum electrode 71A and the lower-stage first lower-level opposing electrode 72A.

The first recovery section 40A, located below the lower-stage first lower-level sorting electrostatic field Ea9, is provided with a lower-stage first recovery conveyor 41A that receives plastic pieces b separated toward the lower-stage first lower-level drum electrode 71A, a first separation and take-out conveyor 42A that receives plastic pieces a separated toward the lower-stage first lower-level opposing electrode 72A, and a lower-stage first separator 43A that can adjust the above described separation conditions.

Furthermore, the lower-stage second upper-level electrostatic sorting section SOB comprises a lower-stage second upper-level drum electrode 51B (rotationally movable electrode) arranged below an exit of the second upper-stage loading chute 21B, a lower-stage second upper-level opposing electrode 52B, and a lower-stage second upper-level scraper 53B. The positive electrode (+) of the high-voltage power supply 2 is connected to the lower-stage second upper-level opposing electrode 52B, while the negative electrode (−) thereof is connected to the lower-stage second upper-level drum electrode 51B via an earth. Consequently, a lower-stage upper-level separating electrostatic field Ea10 is formed between the lower-stage second upper-level drum electrode 51B and the lower-stage second upper-level opposing electrode 52B.

Further, the second lower-stage connection section 60B has a lower-stage second loading chute 61B and a lower-stage second recovery conveyor 62D both arranged therein, the lower-stage second loading chute 61B collecting plastic pieces a (including a small number of plastic pieces b) separated toward the lower-stage second upper-level drum electrode 51B, the lower-stage second recovery conveyor 62B collecting plastic pieces b (including a small number of plastic pieces a) separated toward the upper-stage second upper-level opposing-electrode 53B. Further, a lower-stage second separator (separator) 63B is provided which causes a separation plate to pivot so as to adjust the separation conditions for plastic pieces b separated toward the lower-stage second upper-level drum electrode 51B and plastic pieces b separated toward the lower-stage second-upper-level opposing electrode 52B.

Furthermore, the lower-stage second lower-level electrostatic sorting section 70B comprises a lower-stage second lower-level drum electrode (rotationally movable electrode) 71B arranged below an exit of the lower-stage second loading guide chute 61B, a lower-stage second lower-level opposing electrode 72B, and a lower-stage second lower-level scraper 73B. The positive electrode (+) of the high-voltage power supply 2 is connected to the lower-stage second lower-level opposing electrode 72B, while the negative electrode (−) thereof is connected to the lower-stage second lower-level drum electrode 71B via an earth. Consequently, a lower-stage second lower-level sorting electrostatic field Ea11 is formed between the lower-stage second-lower-level drum electrode 71B and the lower-stage second lower-level opposing electrode 72B.

The second recovery section 40B, located below the lower-stage second lower-level sorting electrostatic field Ea11, is provided with a lower-stage second recovery conveyor 41B that receives plastic pieces a separated toward the lower-stage second lower-level drum electrode 71B, a second separation and take-out conveyor 42B that receives plastic pieces a separated toward the lower-stage second lower-level opposing electrode 72B, and a lower-stage second separator 43B that can adjust the above described separation conditions.

According to the above described embodiment, the second and fourth embodiments are combined together, so that the plastic pieces a, which are electrified to (+), and the plastic pieces b, which are electrified to (−), can be simultaneously collected on the first and second separation and take-out conveyors 42A and 42B, respectively, with a higher purity and a higher recovery rate. Even if the different types of plastic pieces have only a small difference in electrification amount therebetween, these types can be separated from each other with a high purity and a high recovery rate.

Figure 8:
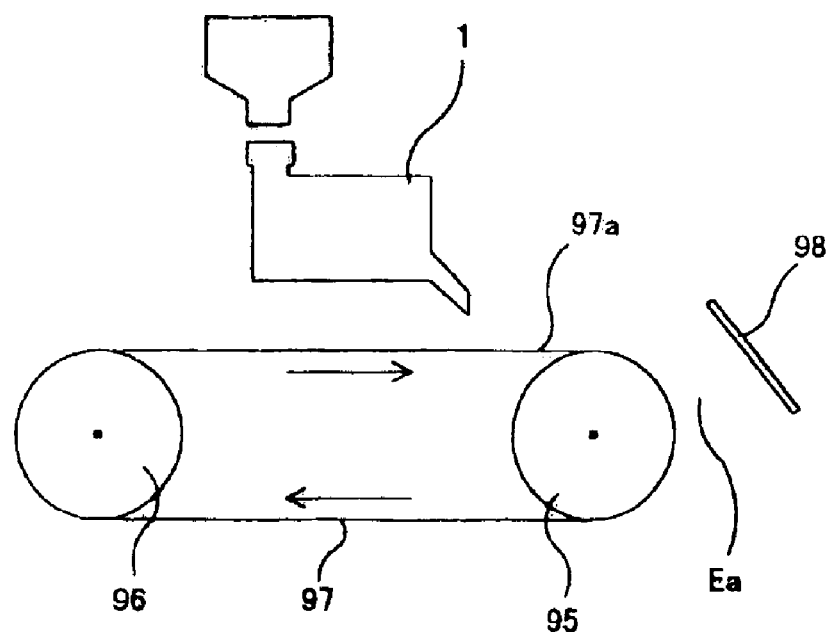
FIG. 8 is a schematic diagram showing a variation of an electrostatic separating section.

Moreover, in the first to sixth embodiments, the rotationally movable electrode is a drum electrode but may be composed of a metallic belt-like endless belt electrode 97 wound around and extended between rotating members 95 and 96 arranged horizontally opposite each other and parallel with each other as shown: in FIG. 8. In this case, by setting a travel path at the top of the belt electrode 97 to extend in the horizontal direction and feeding plastic pieces onto this horizontal portion 97a, the plastic pieces can be stably attracted to a surface of the belt electrode 97 using image force and can then be fed into a separating electrostatic field Ea formed between the belt electrode 97 and an opposing electrode 98 arranged obliquely above a portion of the belt electrode 97 which rotationally moves downward. As a result, the separation precision can further be improved.

Furthermore, in the second, fourth, and sixth embodiments, the lower-stage electrostatic sorting section comprises an upper- and lower-level electrostatic sorting sections. However, the apparatus may have three or more electrostatic sorting sections arranged therein.

INDUSTRIAL APPLICABILITY

As described above, the plastic sorting apparatus according to the present invention is suitable for separating plastic crushed pieces to be collected and recycled, from one another according to their type with a high purity and a high recovery rate.

What is claimed is:
1. A plastic sorting apparatus, comprising:
   a tribo-electrifying section for causing plural types of plastic pieces to frictionally contact with one another for electrification; and an upper-stage electrostatic separating section, a lower-stage electrostatic separating section and a recovery section all of which are located below the tribo-electrifying section downwardly in this order, wherein the upper- and lower-stage electrostatic separating sections each comprises a metallic rotationally-movable electrode having a top portion onto which plastic pieces are fed, an opposing electrode located to oppose a portion of the rotationally movable electrode which moves rotationally downward, and a high-voltage power supply that applies a high voltage to said rotationally movable electrode and opposing electrode to form a separating electrostatic field therebetween, a connection section is provided for feeding plastic pieces separated toward the rotationally movable electrode in the upper-stage electrostatic separating section to the rotationally movable electrode in the lower-stage electrostatic separating section, and polarities applied by the high-voltage power supply respectively to the rotationally movable electrode and the opposing electrode in the upper-stage electrostatic separating section are opposite to those in the lower-stage electrostatic separating section.

2. The plastic sorting apparatus according to claim 1, wherein the connection section includes a separator located therein for adjusting separation conditions of the plastic pieces separated toward the rotationally movable electrode and the plastic pieces separated toward the opposing electrode.

3. The plastic sorting apparatus according to claim 1, wherein the lower-stage electrostatic separating section is composed of a plurality of electrostatic separating sections arranged in a vertical direction and each comprising a rotationally movable electrode, an opposing electrode and a high-voltage power supply, and plastic pieces separated from another plastic pieces toward the opposing electrode in the upper-level lower-stage electrostatic separating section are fed to a lower-level rotationally-movable electrode via the connection section, and wherein polarities of a high voltage applied by the high-voltage power supply respectively to the rotationally movable electrode and the opposing electrode in the uppermost lower-stage electrostatic separating section are the same as those in the lower-stage electrostatic separating section located below the uppermost lower-stage electrostatic separating section.

4. A plastic sorting apparatus, comprising:

a tribo-electrifying section for causing plural types of plastic pieces to frictionally contact with one another for electrification; and an upper-stage electrostatic separating section, a lower-stage electrostatic separating section and a recovery section which are arranged below the tribo-electrifying section downwardly in this order, wherein the lower-stage electrostatic separating section includes therein a lower-stage first electrostatic separating section to which plastic pieces separated toward the rotationally movable electrode in the upper-stage electrostatic separating section are fed via a connection guide section, and a lower-stage second electrostatic separating section to which plastic pieces separated toward the opposing electrode in the upper-stage electrostatic separating section are fed, the upper-stage electrostatic separating section and the lower-stage first and second electrostatic separating sections each comprises a metallic rotationally-movable electrode having a top portion onto which plastic pieces are fed, an opposing electrode arranged to oppose a portion of the rotationally movable electrode which rotationally moves downward, and a high-voltage power supply that applies a high voltage to the rotationally movable electrode and the opposing electrode to form a separating electrostatic field therebetween, the polarity of a high voltage applied to the upper-stage electrostatic separating section by the high-voltage power supply thereof is opposite to the polarity of a high voltage applied to the lower-stage first electrostatic separating section by said high-voltage power supply thereof, and the polarity of a high voltage applied to the upper-stage electrostatic separating section by said high-voltage power supply thereof is the same as the polarity of a high voltage applied to the lower-stage second electrostatic separating section by said high-voltage power supply thereof.

5. The plastic sorting apparatus according to claims 1 and 5, wherein the rotationally movable electrode comprises a cylindrical drum electrode located to be rotatable around a horizontal axis.

6. The plastic sorting apparatus according to claim 4, wherein the lower-stage first and second electrostatic separating sections each comprises a plurality of electrostatic separating sections each including a rotationally movable electrode, an opposing electrode and a high-voltage power supply, the lower-stage first and second electrostatic separating sections each includes a connection section for feeding plastic pieces separated toward the opposing electrode in the upper-level lower-stage first electrostatic separating section, to the lower-level rotationally-movable electrode, the polarity of a high voltage applied by the high-voltage power supply to the rotationally movable electrode and opposing electrode in the uppermost lower-stage first electrostatic separating section is the same as the polarity of a high voltage applied by the high-voltage power supply to the rotationally movable electrode and opposing electrode in the lower-stage first electrostatic separating section located below the uppermost lower-stage first electrostatic separating section, and the polarity of a high voltage applied by the high-voltage power supply to the rotationally movable drum and opposing electrode in the uppermost lower-stage second electrostatic separating section is the same as the polarity of a high voltage applied by the high-voltage power supply to the rotationally movable drum and opposing electrode in the lower-stage second electrostatic separating section located below the uppermost lower-stage second electrostatic separating section.

7. The plastic sorting apparatus according to claim 5 or 6, wherein the connection section includes a separator located therein for adjusting separation conditions of the plastic pieces separated toward the rotationally movable electrode and the plastic pieces separated toward the opposing electrode.

* * * * *